Sept. 28, 1937.    G. FAILLA    2,094,318
METHOD AND MEANS FOR TESTING RADIANT ENERGY
Filed Dec. 1, 1930    3 Sheets-Sheet 1

INVENTOR
GIOACCHINO FAILLA
BY Darby & Darby

Sept. 28, 1937.  G. FAILLA  2,094,318
METHOD AND MEANS FOR TESTING RADIANT ENERGY
Filed Dec. 1, 1930  3 Sheets-Sheet 2

INVENTOR
Gioacchino Failla
BY
Darby & Darby
ATTORNEYS

Sept. 28, 1937.     G. FAILLA     2,094,318
METHOD AND MEANS FOR TESTING RADIANT ENERGY
Filed Dec. 1, 1930     3 Sheets-Sheet 3

INVENTOR
GIOACCHINO FAILLA
BY Darby & Darby
ATTORNEY

Patented Sept. 28, 1937

2,094,318

UNITED STATES PATENT OFFICE 2,094,318

METHODS AND MEANS FOR TESTING RADIANT ENERGY

Gioacchino Failla, New York, N. Y.

Application December 1, 1930, Serial No. 499,287

11 Claims. (Cl. 250—34)

This invention relates to radiant energy devices, and with particularity to methods and means for testing energy radiations.

One of the principal objects of the present invention is to provide a new method of measuring the quality of electromagnetic radiations such as X-rays or the like.

Another object is to provide a device for directly indicating the quality or penetrating power of a beam of X-rays.

Another object is to provide a new method of measuring the effective penetrating power of a heterogeneous beam.

A feature of the invention relates to an X-ray testing device employing an ionization chamber and a novel form of filter, together with means for adjusting the filter to indicate directly the hardness or penetrating power of an X-ray beam under test.

Another feature relates to a novel arrangement of ionization chamber and a novel form of X-ray filter whereby the hardness or penetrating power of a beam of X-rays may be directly determined.

Another feature relates to a novel form of X-ray wedge or filter capable of compensating for the heterogeneous character of an X-ray beam, while indicating directly the hardness or penetrating power of such beam.

Another feature relates to a novel organization and arrangement of ionization chambers for accurately and expeditiously measuring the intensity as well as the hardness or penetrating power of an X-ray beam.

A still further feature relates to a novel arrangement for measuring the hardness or penetrating power of an X-ray beam substantially independently of the beam intensity.

Other features and advantages not specifically enumerated will be apparent after a consideration of the following detail descriptions and the appended claims.

Referring to the drawings—

There is disclosed in application Serial No. 385,912, a method and an apparatus for measuring the intensity of various forms of energy radiations employing a novel compensating or neutralizing arrangement. In many situations in addition to measuring the intensity of an energy radiation such as a beam of X-rays it is highly important to determine the penetrating power of such a beam. While the penetrating power of an X-ray beam is a function of the wave length of the radiations, it is not always convenient in actual practice to measure the wave length of the X-rays whose quality is to be determined. Furthermore, under ordinary circumstances X-rays are produced in a heterogeneous beam as distinguished from a monochromatic beam. It is a well known fact that the energy distribution of such a heterogeneous beam depends upon the components thereof since the energy distribution is different for the different components of the frequency spectrum.

Various methods are in use for measuring the penetrating power, quality or hardness of an ordinary X-ray beam. These methods are:

1. Determination of the "absorption coefficient".
2. Determination of the "half-value layer".
3. Determination of the "effective wave length".

The first method is dependent upon the formula $$I = I_0 \, e^{-\mu t}$$

Where $I_0$ is the initial intensity of the radiation, $I$ is the intensity of the rays which have traversed a thickness $t$ of the material, $e$ is the natural base of logarithms and $\mu$ is the "absorption coefficient". While this formula is strictly applicable to monochromatic rays, it can be used to approximate the penetrating power of heterogeneous rays under certain conditions. However, in order to determine the value of the absorption coefficient it is necessary to obtain an "absorption curve" for the material, which involves considerable time and experimentation.

Under the second method the "half-value layer" may be defined as the thickness of a given material which when interposed in the path of the beam to be tested, reduces the ray intensity to half the initial value. In this method also a special absorption curve is necessary in order to determine the half-layer value.

Under the third method, the "effective wave length" may be defined as the wave length of monochromatic radiation which would be absorbed by a certain thickness of a given material to the same extent as the heterogeneous radiation is actually absorbed by the same material. This method requires the preparation of suitable charts from which it is possible to determine the effective wave length from two measurements of the beam intensity, namely before and after traversing a certain filter.

The above methods vary greatly both in complexity and accuracy and in any event are not very convenient and could not give a direct or unique indication of the actual quality of the beam under test.

Since the hardness or penetrating power of an X-ray beam is dependent upon wave length, it is clear that beams having markedly different spectral distributions may nevertheless exhibit the same hardness index when measured by the usual methods. This is clearly brought out in a paper entitled "A comparison of practical methods of measuring Roentgen-ray quality for therapy", by E. H. Quimby, published in the American Journal of Roentgenology and Radium Therapy, volume 21, No. 1, January, 1929.

Prior to the present invention there has been no better way of expressing the quality of X-rays for practical purposes. So far as is known, there is no measuring device which gives a direct reading or indication of the true quality of X-radiations. Consequently it has always been necessary, prior to the present invention to calculate whatever index is desired, from measurements made with instruments capable of measuring the intensity or quantity of radiation. The chief obstacle in the construction of an instrument to measure directly the true quality of X-radiations has been that the instrument must determine the quality substantially irrespective of the intensity of the beam of X-rays. The instruments about to be described fulfill the latter important requirement and in addition possess other advantages which will be apparent after the description has been considered.

Figures 1, 1A, 1B, 1C, 1D, 2, 3:
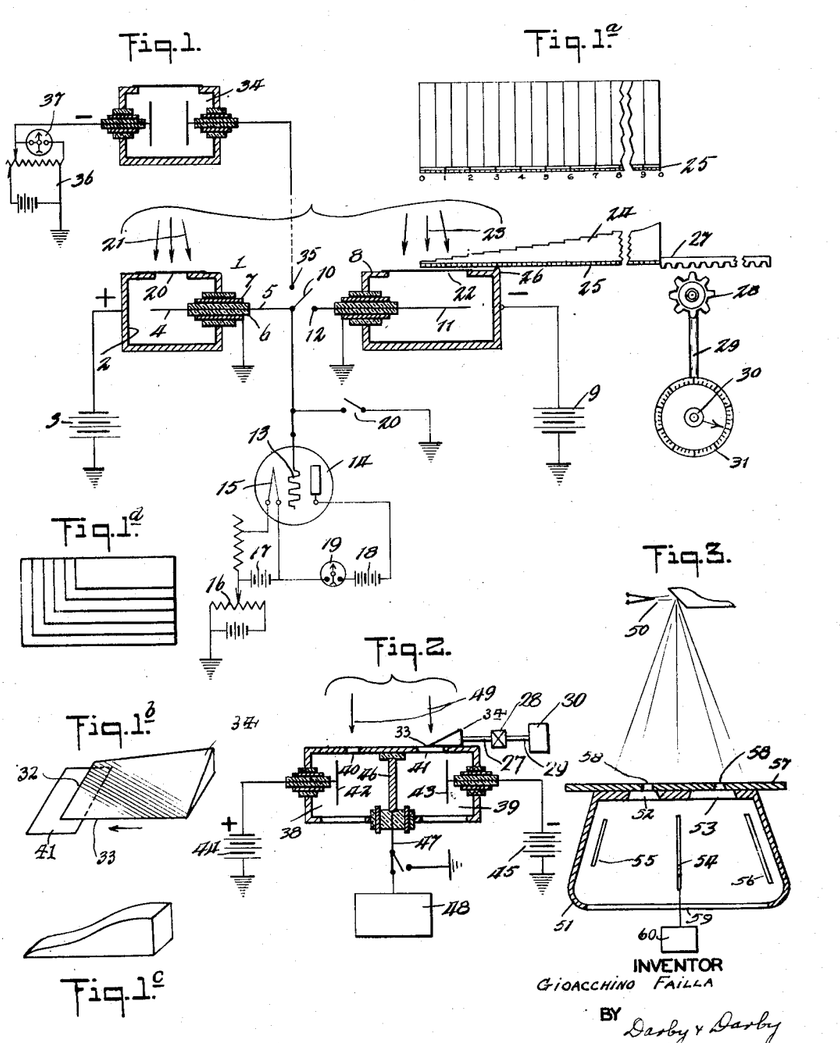
Fig. 1 shows in schematic form a system for measuring the hardness, quality or penetrating power, as well as the intensity of an X-ray beam.
Fig. 1a is a top plan view of the stepped wedge filter of Fig. 1.
Fig. 1b shows a combined wedge filter that may be used in place of the stepped wedge of Fig. 1.
Fig. 1c shows a modified form of wedge filter.
Fig. 1d shows a doubly stepped wedge filter.
Fig. 2 shows the novel form of filter in conjunction with a duplicate ionization chamber for testing an X-ray beam.
Fig. 3 shows schematically how the ionization chambers are positioned so that the intensity of the beam is the same over the diaphragms of both chambers.

Referring more particularly to Fig. 1, the numeral 1 represents an ionization chamber of any known construction. As this chamber may be of any of the types disclosed in application Serial No. 385,912, the chamber may be of iron or other suitable material and provided with a lead lining 2. The chamber is electrically connected to the positive pole of a source of current. Positioned within the chamber 1 is an electrode 4 which is provided with a lead-in and support wire 5 passing through an insulating bushing 6 which is provided with a grounded guard ring 7. The chamber 1, for the purpose of description, will be named the "primary chamber". A similar ionization chamber 8 is provided and is connected to the negative pole of a potential source 9. The chamber 8 will be termed the "auxiliary chamber". A switch 10 is provided for connecting the electrode 4 of the chamber 1 to the corresponding electrode 11 of chamber 8, through switch contact 12. Switch 10 is also connected to the control electrodes 13 of an audion, or electron discharge device 14. The cathode 15 of this electron discharge device is connected to a grounded potentiometer 16 whereby the potential of the cathode may be raised or lowered with respect to ground. The usual source of cathode heating current 17 and anode potential 18 are provided and in addition a suitable indicating device 19 is connected in the anode circuit. A grounded switch 20 is provided for temporarily grounding the control electrode 13.

From an inspection of Fig. 1, it will be noted that the chamber 1 is provided with a diaphragm aperture 20 for allowing the ionizing radiations 21 to enter the chamber 1. A similar diaphragm aperture 22 is provided for chamber 8 through which the ionizing radiations 23 may enter the latter chamber. It will be noted, however, that the aperture 22 is larger than the aperture 20 for purposes that will be clear from the description given herein below. The ionizing radiations 21 and 23 are represented in the drawings as separate beams. Thus these beams may be derived from two substantially constant sources of radiations such as two tubes each containing a quantity of radio-active material, together with means such as an apertured diaphragm for limiting the beams to a predetermined cross section. Instead of using two separate radio-active sources, a single source such as an X-ray generator may be employed and the radiation beam from this generator may enter both the chamber 1 and the chamber 8. In this latter case, however, it is preferred to position the chambers so that the same intensity of beam enters both chambers. One method of accomplishing this will be described in connection with Fig. 3. It will be understood that the showing of the beams 21 and 23 in the drawings is purely schematic and that any source or sources of ionizing radiations may be employed so long as the same intensity of ionizing radiations is over each of the diaphragms 20 and 22 respectively.

In addition it is preferred to make the chamber 8 of greater volume than the chamber 1, or at least to provide a greater amount of ionizable medium in the chamber 8 than in the chamber 1. Thus instead of using chambers of unequal size the chambers 1 and 8 may be of the same size but may contain different gases providing different quantities of ionization when subjected to the same intensity ionizing radiations. As an alternative the chambers may be made of the same size or of the same ionizing volume, and electrodes having different effective ionizing powers may be employed.

Adapted to be positioned above the chamber 8 and to be moved across the aperture 22 is a wedge shaped filter 24. For convenience of manufacture this filter may be made in stepped thicknesses as shown clearly in Figs. 1 and 1a of the drawings. The wedge 24 may be made of any suitable material or materials. Certain of the layers or steps may consist of different material from other layers, for example the lowermost layer may consist of a material highly transparent to the ionizing radiations and the successive layers may consist of materials having progressive opaqueness to the radiations. It will be understood, however, that these latter alternatives are not necessary and that a simple stepped wedge of the same material may be employed. The member 24 is adapted to slide across the top of the chamber 8, and for this purpose the chamber 8, or any convenient adjunct thereto, may be provided with suitable guides (not shown) for the member 24. The member 24 has attached thereto, or otherwise marked thereon, a suitable scale 25 which may be graduated in selected units of quality, penetrating power or hardness. A fixed pointer 26 may be attached to the chamber 8 or at any convenient point adjacent thereto to indicate the position of the wedge filter 24 relatively to the aperture 22. If desired, although this is not absolutely necessary, the member 25 may be provided with a rack-like extension 17 which cooperates with a pinion 28 connected to a flexible shaft 29. Shaft 29 terminates in an adjusting handle 30 which plays over a dial 31. The handle 30 and dial 31 may be situated at a convenient distance from or a convenient place with respect to the ionization chamber and ionizing radiations. The dial 31 will, of course, be graduated to correspond with the scale 25, so that the position of the wedge 24 may be observed without being close to the instrument proper.

From the foregoing it will be seen that if both the chamber 1 and the chamber 8 are completely exposed to the ionizing radiations the ionization produced in chamber 8 will be larger than the ionization in chamber 1. By moving the wedge filter 24 over the aperture 22, however, the amount of ionizing radiation entering chamber 8 may be gradually decreased since the member 24 is in effect a succession of filters of increasing thickness. Consequently the ionization in chamber 8 may be decreased until it is exactly equal to or in any predetermined ratio with respect to the ionization in chamber 1.

For the present it will be assumed that the apparatus is to operate by producing ionization equality in the two chambers. When this has been effected by movement of wedge 24 as above described and the currents in the two chambers are in the same magnitude, (assuming of course that switch 10 is closed on contact 12) then the indicating device 19 will show no deflection upon momentary closure of the switch 20. If, on the other hand the ionizations in the two chambers are not of equal magnitude (or are not in a predetermined ratio) the device 19 will indicate a deflection upon closure of switch 20. It will be understood, of course, that the device 14 has been previously adjusted to bring the control electrode 13 thereof to ground potential in the manner described in detail in application Serial No. 385,912. Suffice it to say for the present that this initial adjustment is attained with switch 10 on contact 12 with no ionizing radiations entering either of the chambers. Under this condition the potentiometer 16 is adjusted to vary the potential of the anode cathode system of tube 14 until the meter 19 shows no indication when the switch 20 is closed. In other words, the cathode anode system of tube 14 is adjusted to bring the grid 13 to ground potential, at which time there is a certain anode current. If, therefore, the switch 20 is closed connecting ground directly to the grid 13 there will be no deflection on the meter 19.

As described in detail in said application, the potential of the cathode 15 may be adjusted by means of potentiometer 16 until the electrode 13 assumes ground potential. The existence of this ground potential is indicated by the device 19 which shows no deflection when the switch 20 is momentarily closed. After securing this preliminary adjustment of the device 14, the ionizing radiations are projected into the chambers 1 and 8 and the wedge member 24 may be moved until the ionization in chamber 8 equals in magnitude the ionization in chamber 1. Under this condition of course there is no current flow to or away from the grid 13 from either of the ionization chambers and consequently the member 13 is then at ground potential and this is indicated by closure of switch 20 and observation of the indicator 19 which under this condition does not deflect.

It will be understood, of course, that while the balance detecting arrangement shown in Fig. 1 is the preferred type of detector any other sensitive voltage detector such as an electrometer or the like may be employed if desired.

From the foregoing it will be seen that all that is necessary to determine the true hardness, penetrating power or quality of the ionizing radiations is to adjust the wedge filter 24 until the indicator 19 shows no deflection when the switch 20 is closed and the degree of hardness or quality may be read directly on the scale 25 or the dial 31.

It is important to note that the ionizing radiation which ionizes the gas or other ionizable medium in chamber 8, is made up of components which have traversed different thicknesses of the wedge-shaped or "echelon" filter 24. For this reason a large part of the spectral range of the radiation contributes to the ionization in chamber 8. In other words, if the radiation to be tested is heterogeneous in character a portion of each part of the radiation spectrum enters the chamber 8, the less penetrating portions entering through the thin portions of the wedge and the higher penetrating portions of the radiation entering through the thicker portions of the wedge. Therefore, the reading on scale 25 is a very close index of the actual spectral distribution of the radiation falling on the instrument and the reading is determined by the above described adjustment substantially independently of the intensity of the ionizing radiation. While it is theoretically possible to have two or more beams of radiation with different spectral distributions that would nevertheless give the same reading on this instrument, in practice this has been found not to be the case. In the case of X-rays for example the quality thereof may be varied—

1. By varying the voltage applied to the X-ray tube,
2. By varying the usual filter, and
3. By varying both voltage and filter.

(To some extent the quality of the X-rays may be varied by using different materials for the target of the X-ray tubes, but practically all commercial tubes have tungsten targets). Under these conditions it is extremely unlikely that two practical beams of X-rays give the same reading on scale 25 when they differ materially in spectral distribution. For all practical purposes it has been found that the instrument disclosed gives a unique index of the true quality of any given beam. In the past this determination of quality has been impossible by any method which has been suggested, with the possible exception of the X-ray spectrometer, which of course is out of the question for practical or routine measurements.

The degree of differentiation that may be obtained between beams that differ slightly in quality depends on the relative shape and size of the chambers 1 and 8, as well as on the material or materials and the angle of the wedge 24. The relative properties of these parts will depend on the character of the radiation to be measured. To measure the quality of the low voltage X-rays used in radiography, the wedge 24 may be made of aluminum while in the case of high voltage X-rays used in cancer treatment or metal radiography the wedge 24 would be made of copper or other metal having the desired atomic weight. As another illustration, for the measurement of gamma rays of radium or of X-rays produced at 500,000 volts or higher voltages the wedge would be made of lead or other dense material.

As an example of an instrument constructed according to Fig. 1 it may be mentioned that the chamber 1 and the chamber 8 may differ only in length. If chamber 8 is twice as long as chamber 1, its volume will be essentially twice as large, the diaphragm apertures 20 and 22 will be in the same ratio, and the ionization currents will also be in the same ratio. It follows therefore that in order to obtain a balance on the instrument as indicated by the device 19 the wedge 24 will be adjusted to such a position as to reduce the ionization in chamber 8 to half the value which it would have without the wedge. The material and thickness of the wedge (that is, its angle) which can be used to bring this about will depend in a great measure on the quality of the X-ray beam being tested. It is to be noted in this connection that too large a ratio between the ionization in the two chambers, in the absence of the filter wedge is undesirable.

For instance assume an extreme case wherein the ionization in chamber 8 (without the filter wedge) is 100 times that in chamber 1. The wedge under these circumstances will have to be sufficient to decrease the ionization in chamber 8 one hundred fold. In the case of hard X-rays the wedge would have to be extremely thick. On the other hand a wedge of very small angle for these hard X-rays would be undesirable because then the chamber would be covered by a practically uniform filter and the softer components will be absorbed almost entirely. In this assumed case, therefore, a very blunt wedge would be required, and it would have to be of sufficient thickness at one end to stop practically any radiations from reaching the chamber B. Thus the instrument may be provided with a plurality of wedges each of which corresponds to a certain range of hardness of the radiations to be tested, one wedge being used in testing certain classes of rays, other wedges being used in testing still other classes of rays. In either event the wedge will be provided with suitable scales which have been previously calibrated to indicate the selected units of hardness, quality or penetrating power.

Referring to Fig. 1b there is shown a modified form of wedge which is provided with a double taper. The numeral 41 represents schematically the diaphragm aperture of the auxiliary chamber such as the chamber 8 of Fig. 1 and the wedge is adapted to be moved over the aperture in the direction of the arrow. The advancing edge 32, as well as the side edge 33 is knife-like, and the wedge gradually increases in thickness throughout its length, as well as throughout its width towards the corner 34. Preferably with this type of wedge the wedge does not cover the entire width of the aperture diaphragm 41, so that for all positions of the wedge over the aperture 41 there is some radiation entering the chamber which does not pass through the wedge. For purposes of convenience this wedge of Fig. 1b will be referred to in the claims as a compound wedge. It will be understood of course that the wedge 33 will be provided with a scale similar to the scale 25 of Figs. 1 and 1a.

Instead of using a compound wedge such as shown in Fig. 1b a curved wedge such as shown in Fig. 1c may be employed. The curvature of this wedge will of course depend upon the type of scale 25 that is desired. For example, it may be found that, using the flat stepped wedge of Fig. 1a, the scale 25 will be required to be graduated in unequal spaces and for this purpose the curvature of the wedge such as the wedge of Fig. 1c may be designed so that the associated scale will have uniform graduations. Similarly the advantages of the combined wedge of Fig. 1b may be achieved by providing a doubly stepped wedge such as shown in Fig. 1d. Instead of using the flat double stepped wedge of Fig. 1d this wedge may be built up of a great number of extremely thin laminae to give it in effect the curvature of the wedge in Fig. 1b.

Under certain circumstances it may be desirable to use the instrument of Fig. 1 to measure intensity as well as hardness of the ionizing radiations, and for this purpose an additional ionization chamber 34 is provided. This chamber corresponds to the compensating chamber disclosed in application Serial No. 385,912 and when the instrument is to be used for measuring the intensity of radiation the switch 10 is closed on contact 35. The chambers 1 and 34 are thus connected to the device 14 which is then adjusted to bring the electrode 13 to ground potential. The radiation whose intensity is to be determined is then allowed to enter the primary chamber 1 and the chamber 34 which, for example, may contain a quantity of radio-active material, is connected to an adjustable source of negative potential 36 having a voltmeter 37 as shown, which may be calibrated directly in intensity units. If the ionizing radiations entering chamber 1 produce an ionization current which is different from the ionization current produced in the standard or compensating chamber 34, then the source 36 is adjusted until the device 19 does not deflect upon closure of switch 20. This condition indicates that the ionization current in chamber 1 is the same as that in the standard chamber 34, whereupon the indicating device 37 (calibrated in intensity units) will indicate the actual intensity of the radiations entering chamber 1.

For a further detailed description of the method of using chambers 1 and 34 to measure intensity of radiation reference may be had to application Serial No. 385,912.

Instead of using two separate chambers such as the chambers 1 and 8 of Fig. 1, a duplicate or duplex ionization chamber may be employed. Such a chamber is schematically illustrated in Fig. 2 and comprises two portions 38 and 39 which are provided with respective aperture diaphragms 40 and 41, the diaphragm 41 being larger than the diaphragm 40. Electrodes 42 and 43 are insulatingly mounted in the opposite walls of the duplex chamber and connected respectively to positive and negative potential sources 44 and 45. A common electrode 46 is insulatingly mounted within the duplex chamber and is connected by conductor 47 to a balance indicating arrangement 48 such as disclosed in Fig. 1 and described in detail in application Serial No. 385,912. In Fig. 2 it will be noted that the lower walls of the duplex chamber are open to allow the ionizing radiation to emerge from the chamber without striking any portion of the chamber wall. The ionizing beams pass through the respective portions of the duplex chamber without encountering any materials except the medium to be ionized. The duplex chamber is adapted to be exposed, preferably to a single source 49 of ionizing radiations such as an X-ray tube or the like, and a wedge filter 34 is adapted to be moved over the apertured diaphragm 41 as described in connection with Fig. 1. This wedge is preferably of the type shown in Fig. 1b, although wedges such as shown in Figs. 1a, 1c, 1d may be employed. It is believed that the method of balancing and adjusting the wedge to indicate the quality of the ionizing radiations entering the chambers 40 and 41 will be clear from the foregoing detail description of Fig. 1, and further description thereof is not believed necessary at this point.

When a single source of ionizing radiations is used such as an X-ray tube or the like, or a single tube containing a radio-active material, the ionizing beam therefrom is a divergent one, and it may very well be that at different points in the cross section of the beam there exist different intensities of radiation.

It is highly desirable that the same intensity of beam enter both the primary chamber and the auxiliary or testing chamber.

Fig. 3 illustrates schematically one preferred manner of securing this equality of intensity. In this figure the numeral 50 represents a source of X-rays such as an X-ray tube. The numeral 51 represents a duplex ionization chamber of the "open air" type. This chamber is provided with two tapered apertured diaphragms 52 and 53 corresponding to the diaphragms 40 and 41 of Fig. 2. A common electrode 54 is insulatingly mounted within the chamber and lateral electrodes 55 and 56 are also mounted within the chamber. Preferably, the lateral electrodes are mounted at an angle to conform more nearly to the shape of the beam of radiation. The diaphragm 57 is adapted to be positioned in the path of the beam from source 50, said diaphragm being provided with two small slits or apertures 58 of equal size.

The duplex chamber 51 has its lower wall open as indicated by the numeral 59 to allow the ionizing radiations to pass outwardly of the chamber without impinging upon any metal parts thereof. The method of positioning the duplex chamber is as follows. The apertured member 57 is positioned in the ionizing beam and the chamber 51 is moved until the same amount of ionization is produced between the common electrode 54 and electrode 56 as is produced between the common electrode 54 and the electrode 55. This condition is indicated by the detecting arrangement 60 which may be an electrometer or an electron discharge device such as disclosed in Fig. 1. When the chamber 51 has been thus properly positioned it is an indication that the same intensity of beam is entering through both apertures 58 into the respective sections of the ionization chamber and thereupon the member 57 may be withdrawn and the chamber is in the proper position relatively to the ionizing beam to enable it to be used for measuring as described in connection with Figs. 1 and 2.

Figure 4:
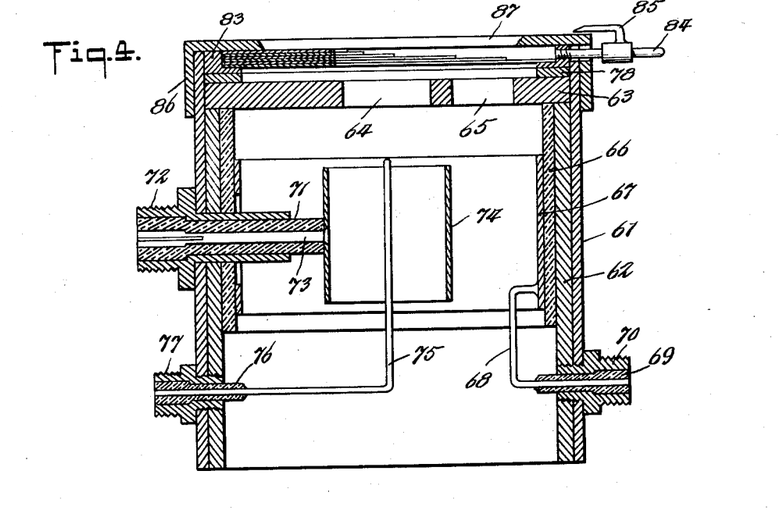
Fig. 4 shows a still further modification of a duplicate ionization chamber and circular wedge filter that may be used in place of the chambers and wedge shown in Figs. 1 and 2.
Figures 5, 6, 7:
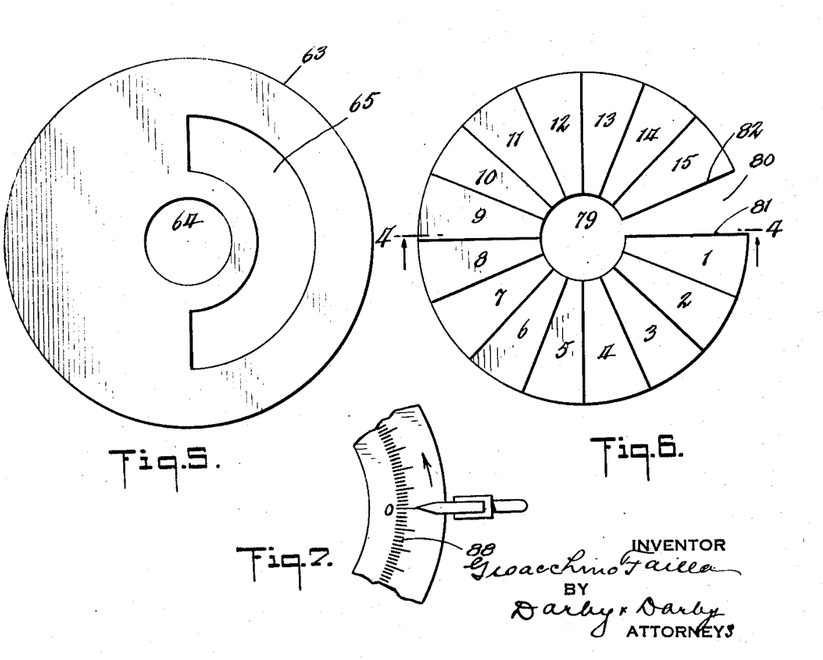
Fig. 5 is a detail plan view of the fixed apertured diaphragm used in the device of Fig. 4.
Fig. 6 is a detail plan view of the circular graduated wedge used in the device of Fig. 4.
Fig. 7 is a partial detail view showing the scale and pointer for indicating directly the quality or penetrating power of the X-ray beam under test.

Referring to Fig. 4 there is shown a modified form of duplex measuring chamber which is substantially cylindrical in shape and is provided with a circular stepped wedge in place of the rectangular stepped wedge shown in Fig. 1. The chamber consists of a cylindrical brass member 61 which is provided with a lead lining 62 and the upper end of which is partially closed by means of a circular opening 64 and a semi-circular arcuate opening 65. Attached to the external face of the lead lining 62 in any suitable manner is a hard rubber cylinder 66 which in turn has attached to its inner face a shorter aluminum cylinder 67. Cylinder 67 acts as one of the electrodes for the chamber and for this purpose it is provided with a lead-in wire 68 which passes through an insulating plug 69 of hard rubber, amber, or other suitable insulating material. The plug 69 is in turn fastened within a threaded bushing 70 which is screwed into the wall 61 of the chamber. A similar insulating plug and bushing 71 and 72 respectively pass through the opposite side of the chamber for insulating the lead-in member 73 from the metal of the chamber. The member 73 may be threaded or otherwise securely fastened in the insulating plug 71 and at its inner end said wire 73 is welded, soldered or otherwise united to a cylindrical aluminum member 74 which serves as the common electrode for the duplex chamber. The third electrode is in the form of a wire or rod 75 positioned centrally with respect to the cylindrical electrodes 67 and 74, and is provided with an insulating plug 76 and threaded bushing 77, for insulatingly mounting the electrode in the wall of the chamber. When the chamber is used the wire 73 is adapted to be connected to the balance detecting arrangement such as shown in Fig. 1, while the electrodes 67 and 75 are connected to respective sources of positive and negative potential as hereinabove described. It will be noted that the arcuate aperture 65 and the member 63 are so designed as to be in alignment with the space between the electrodes 67 and 74 while the central opening 64 is in alignment with the space between the electrodes 74 and 75. An annular metal member 78, preferably of brass is positioned above the lead washer 63 to hold the same in position and also to provide a bearing surface for the circular stepped wedge shown in detail in Fig. 6. This wedge is made up of a series of superimposed radially disposed metal strips providing an open central portion 79 adapted to register with the opening 64 in the lead member 63. The circular wedge as shown in the drawings is made up of fifteen steps with a clear space 80 between the first and the last space, thus in effect providing a gradual increase of thickness from the edge 81 to the edge 82. Instead of making the wedge out of superimposed strips, it will be obvious that the wedge may be made out of a single piece of material suitably cut to provide any number of graded steps, or if desired, the wedge may be machined to provide a continuous tapered surface corresponding to the surface illustrated in Fig. 1c. In addition, if desired the circular wedge may be machined to provide a compound wedge arrangement embodying the features illustrated in Fig. 1b or to provide a double step cross section as illustrated in Fig. 1d. The circular wedge is preferably attached to a recessed brass member 83 which carries an adjusting handle 84 provided with an index finger 85. A closure member 86 surrounds the top of the chamber and holds the circular wedge in position and enables the said wedge to be turned through an angle of 180 degrees or more by means of the arm 84. The member 86 is provided with a large circular opening 87 and the upper surface of member 86 is provided with a suitable scale 88 partly shown in Fig. 7 to indicate the position of the circular wedge.

From the foregoing it will be clear that as the wedge is rotated from its zero position in the direction of the arrow (Fig. 6) that gradually increasing thicknesses of the filter are presented to the opening 65. The manner of using the duplex chamber is substantially the same as that described in connection with Figs. 1, 2 and 3, and further description thereof is not believed necessary beyond stating that the same intensity of ionizing beam enters simultaneously through the openings 64 and 65.

Figure 8:
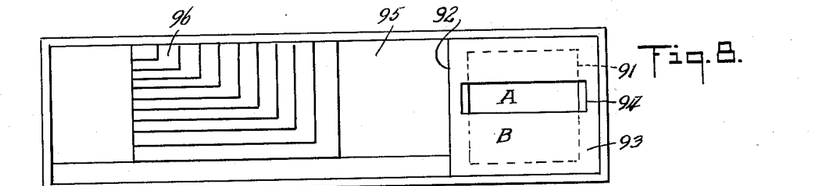
Fig. 8 shows a view of a modified form of filter wedge.
Figures 9, 10, 11:
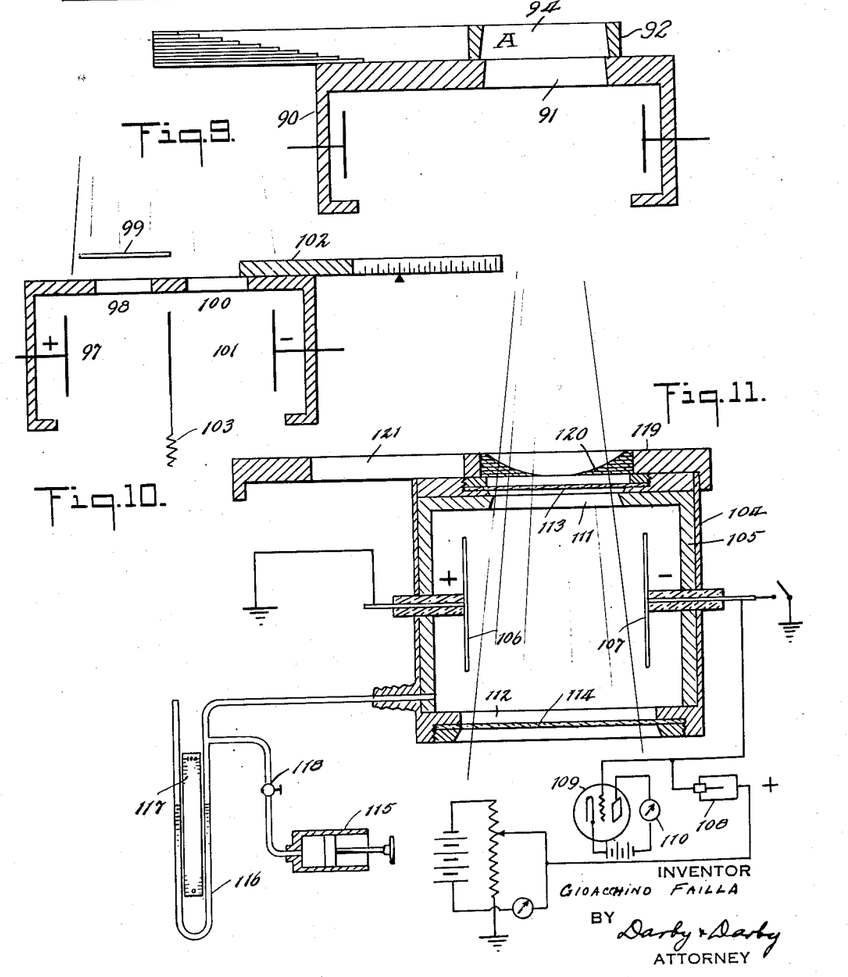
Fig. 9 is a partial sectional view of the wedge and ionization chamber diaphragm of Fig. 8.
Fig. 10 shows an instrument for directly reading quality of an X-ray beam in terms of "effective wave length"
Fig. 11 shows a still further modification of instrument for measuring quality of X-rays.

Referring to Figs. 8 and 9 a description will now be given of an instrument for testing X-rays with a single ionization chamber. The ionization chamber 90 may be of any well known type having an apertured diaphragm 91 and provided with a slidable member designated generally by the numeral 92 adapted to be moved across the aperture 91. This member 92 is provided with three separate portions, the first portion consists of a uniform thickness of metal 93 having a slit 94 longer than the aperture 91 but only a portion of the width of said aperture. The next portion 95 of member 92 is completely open, while the third portion 96 consists of a doubly stepped wedge filter such as shown in Fig. 1d, or a compound wedge as shown in Fig. 1b. This compound wedge is narrower than the aperture 91 for reasons described in connection with Fig. 1a and Fig. 2.

The manner of using the instrument is substantially as follows: The member 92 is positioned with slit 94 over aperture 91 in the position shown in Fig. 8 and the radiation to be tested enters the chamber 90. By means of a suitable measuring device such as the radium compensating chamber 34 (Fig. 1) and the calibrated indicator 37, the potentiometer 36 is varied until a balance is indicated, thus giving a measurement of the intensity of the radiation. Instead of using the compensating chamber to measure the intensity, a previously charged electroscope may be connected to the ionization chamber, and the time of discharge of the electroscope noted.

When the compensating chamber method is used the reading on device 37 is noted at balance and the potentiometer is left at the "balance" position. Member 92 is then moved to first bring the open portion 95 over the chamber, and then the wedge filter portion 96. The wedge is moved until a balance is again obtained, i. e. until the device 37 indicates the same value as when slit 94 was over the chamber. It will be understood of course that the member 92 carries a suitably calibrated scale similar to scale 25 (Fig. 1a). When an electroscope is used the wedge is moved until the same time is required to discharge it, as was required to discharge it when slit 94 was in registry with aperture 91.

The double ionization chamber may be used to measure directly in units of "half-value layer". Thus one chamber will have an aperture just twice as large as the other (the effective ionizing volume of the chambers being otherwise equal). A very slender wedge filter is then interposed over the larger aperture until the ionization current is the same in both chambers. Under this condition the filter absorbs one-half the radiation tending to pass into the associated chamber, and therefore the thickness of filter over the aperture is the "half-value thickness" for the particular beam being tested. With a very slender wedge and a narrow aperture the thickness of the wedge over the aperture is substantially uniform. Of course, in this case also the wedge will be provided with a suitable scale calibrated in units of "half-value thickness". It will be obvious also that instead of using two equal volume chambers and apertures of a two to one ratio, that equal size apertures or slits may be employed with chambers having effective ionized volumes in ratio of two to one.

This arrangement has the advantage that a single ionization chamber is sufficient. It can also be used with any device capable of measuring ionization currents whether it be a compensation device, a direct reading instrument, or an electroscope. Furthermore, the same instrument and setting may be used to measure intensity and quality.

Referring to Fig. 10 there is shown schematically an instrument for directly measuring X-ray quality in terms of "effective wave length". In this embodiment one ionization chamber 97 is provided with a fixed aperture 98 covered by a filter 99 of uniform thickness such as is ordinarily used in determining "effective wave length" (usually 1 mm. thickness of copper). The aperture 100 in the other chamber 101 is provided with an adjustable closure member 102 to vary the size of the aperture. In using the instrument the radiation to be tested is allowed to enter both chambers and the member 102 is moved until a balance of ionization currents is indicated by device 103 which may be any sensitive balance detector such as shown in Fig. 1. The member 102 is of course provided with a scale similar to scale 25 (Fig. 1a) calibrated in units of "effective wave length."

Referring to Fig. 11 a description will now be given of what may be termed a substitution method of measuring the radiations by using different pressures of ionizable medium in the ionization chamber. In Fig. 11 the ionization chamber 104 may be of brass or other material provided with a lead lining 105. The electrodes 106 and 107 are insulatingly mounted in any approved manner in the chamber walls. The electrode 106 may be connected to a source of positive potential while the electrode 107 may be connected to a suitable balance detecting arrangement comprising a radium compensating chamber 108, a "floating-grid" electron device 109 and an indicator 110. As described in application Serial No. 385,912 chamber 108 is connected to a calibrated adjustable potential source of opposite potential to that applied to electrode 106. The upper wall of the chamber 104 is provided with an aperture 111 which has tapered sides to conform in general to the shape of the radiation beam to be tested. A similar aperture 112 is provided in the lower wall of the chamber. The apertures are adapted to be sealed or closed in an airtight manner by windows 113, 114 of celluloid or other light material. The interior of the chamber 104 communicates with a supply of ionizable medium and a suitable pressure device 115 for forcing the medium under pressure into the chamber 104. A mercury manometer device 116 and scale 117 are provided for indicating the pressure of the ionizable medium in chamber 104. A suitable valve 118 is provided for the pressure line.

Mounted for sliding movement over the chamber is a brass member 119 having a circular concave or stepped wedge filter 120, and an open portion 121.

One manner of using the device of Fig. 11 is as follows: With the member 119 positioned with the filter wedge 120 directly over the window 111, balance the ionization current in the chamber by applying voltage on the radium chamber 108. Maintain this voltage on the radium chamber and shift wedge 120 to one side of diaphragm aperture to bring portion 121 in registry therewith. Since now there is nothing in the path of the rays entering the chamber except the thin celluloid 113, the ionization current is larger than before and instrument is unbalanced. Balance is obtained by pumping out some air so as to decrease the ionization current. Pressure difference in chamber 104 is read on the mercury manometer 117 which may be calibrated to give a direct indication of the quality of the beam.

Procedure can be reversed by balancing first with the wedge away from aperture, then placing wedge over aperture and balancing by increasing pressure of air in the chamber.

While specific arrangements and embodiments have been disclosed in the drawings it will be understood that the invention is not limited thereto, and that various changes and modifications may be made without departing from the spirit and scope of the invention.

What is claimed is:

1. The method which comprises exposing a pair of ionization chambers to a beam of ionizing radiations, interposing a filter between the beam and one chamber only and varying the position of said filter to determine directly the quality of said beam.

2. An instrument for measuring the quality of an X-ray beam comprising a duplex ionization chamber, a common central electrode and a pair of lateral electrodes within said chamber, a pair of apertures in the wall of said chamber for allowing portions of said X-ray beam to enter said chamber, each portion of the beam ionizing separate volumes of ionizable medium between the central electrode and the lateral electrodes, a wedge-like filter for varying the ionization in one of said volumes without affecting the other, and means including an electron-discharge detector of the control-electrode type for determining when the total ionization between the central electrode and one lateral electrode bears a predetermined ratio to the total ionization between said central electrode and the other lateral electrode.

3. An instrument according to claim 2 in which means is provided for insuring that the portions of the beam entering said chamber are of substantially equal intensity.

4. An instrument according to claim 2 in which the walls of the duplex chamber opposite said apertures are open to allow said portions of said beam to pass through said chamber and to freely emerge therefrom while traversing only the medium between the associated electrode.

5. An instrument according to claim 2 in which the entrance aperture to one section of said chamber is larger than the entrance aperture to the other section of said chamber.

6. The method of determining the quality of a beam of ionizing radiations employing two ionization chambers which comprises admitting portions of the said beam of ionizing radiations into the two chambers respectively through two diaphragm apertures to produce in one chamber a total ionization which is different from the total ionization in the other chamber, interposing a filter between said beam and the aperture of one of said chambers only, and varying the aperture of the other chamber to determine directly the quality of said beam.

7. An instrument for measuring the quality of an X-ray beam comprising a duplex ionization chamber having a pair of lateral spaced electrodes and a common central electrode for said lateral electrodes said common electrode also serving as a dividing wall between the two sections of the chamber, a wedge-like filter for half of said chamber, and means including an electron-discharge detector of the control-electrode type for determining when the total ionization in one-half of the duplex chamber bears a predetermined ratio to the total ionization in the other half of the duplex chamber.

8. An instrument for testing ionizing radiations comprising a first ionization chamber, a second ionization chamber, means to ionize the contents of said chambers by said radiations so that the total ionization in one chamber is different from the total ionization in the other chamber, means to adjust the total ionization in one of said chambers to a predetermined ratio to the total ionization of the other of said chambers, an audion for detecting when the ratio of total ionizations in said chambers is unity, said audion having its control grid floating and normally at ground potential, and means connecting the control-grid of said audion to a point between said chambers to detect when said point assumes ground potential.

9. The method of detecting the quality of an X-ray beam employing a pair of interconnected ionization chambers and a detector tube of the audion type which comprises connecting the control grid of the tube to the interconnection between said chambers, adjusting a selected point in the anode-cathode circuit of the tube with respect to ground until the control grid of the tube assumes ground potential while disconnected from the anode and cathode, exposing the contents of said chambers to the X-ray beam, interposing a calibrated absorbing member in front of one chamber only, and moving said member to vary the total ionization in one chamber until the anode-cathode current of said tube is the same as when the grid of said tube is conductively connected to ground.

10. An instrument for determining the quality of an X-ray beam comprising a pair of ionization chambers, means to expose the contents of each chamber to the X-ray beam so that normally the total ionization in one chamber is different from but in a predetermined ratio to the total ionization in the other chamber, interposing a graduated filter in the path of the beam entering one chamber said filter being movable to bring the total ionizations in the chambers to equality, an electron discharge tube to detect when said equality is reached, and a calibrated scale movable with said filter to indicate the quality of said beam.

11. An instrument for measuring the hardness of an X-ray beam substantially independently of its intensity comprising two ionization chambers designed to have unequal total ionizations produced therein when exposed to similar X-ray beams, a wedge filter interposed in the path of the beam entering one chamber and movable to equalize the total ionizations in said chambers, and means including an electron discharge device having a cathode, anode and control electrode for detecting when said equalization is completed, said device having its control grid connected to the chambers and normally at ground potential without a conductive connection to its cathode.

GIOACCHINO FAILLA.